US010706650B2

(12) United States Patent
Tamane et al.

(10) Patent No.: US 10,706,650 B2
(45) Date of Patent: Jul. 7, 2020

(54) KEY UNIT, CONTROL SYSTEM, CONTROL METHOD, AND NON-TRANSITORY COMPUTER-READABLE STORAGE MEDIUM HAVING PROGRAM STORED THEREIN

(71) Applicants: Toyota Jidosha Kabushiki Kaisha, Toyota-shi Aichi-ken (JP); Nomura Research Institute, Ltd., Tokyo (JP); Kabushiki Kaisha Tokai Rika Denki Seisakusho, Niwa-gun, Aichi (JP)

(72) Inventors: Yasuyuki Tamane, Miyoshi Aichi-ken (JP); Tsukasa Takahashi, Chiyoda-ku Tokyo (JP); Masaki Oshima, Niwa-gun Aichi-ken (JP)

(73) Assignees: Toyota Jidosha Kabushiki Kaisha, Toyota-shi, Aichi-ken (JP); Nomura Research Institute, Ltd., Tokyo (JP); Kabushiki Kaisha Tokai Rika Denki Seisakusho, Niwa-gun, Aichi (JP)

( * ) Notice: Subject to any disclaimer, the term of this patent is extended or adjusted under 35 U.S.C. 154(b) by 0 days.

(21) Appl. No.: 16/158,705

(22) Filed: Oct. 12, 2018

(65) Prior Publication Data

US 2019/0122471 A1 Apr. 25, 2019

(30) Foreign Application Priority Data

Oct. 23, 2017 (JP) ................................. 2017-204751

(51) Int. Cl.
*G07C 9/00* (2020.01)
*B60R 25/20* (2013.01)
(Continued)

(52) U.S. Cl.
CPC ...... *G07C 9/00309* (2013.01); *B60R 25/2045* (2013.01); *B60R 25/24* (2013.01);
(Continued)

(58) Field of Classification Search
None
See application file for complete search history.

(56) References Cited

U.S. PATENT DOCUMENTS

| 10,557,300 B2* | 2/2020 | Tagtow | E05F 15/76 |
| 2013/0162421 A1* | 6/2013 | Inaguma | H04B 5/0031 340/438 |

(Continued)

FOREIGN PATENT DOCUMENTS

| JP | 2006118122 A | 5/2006 |
| JP | 2011-256561 A | 12/2011 |

*Primary Examiner* — Carlos Garcia
(74) *Attorney, Agent, or Firm* — Dinsmore & Shohl LLP

(57) ABSTRACT

A key unit includes: a first communication module; a second communication module; an authentication unit configured to perform authentication using authentication information when an operation request including the authentication information has been received via the first communication module; and a control unit configured to perform locking and unlocking with a key in response to the operation request when the authentication using the authentication information has succeeded and to transmit a control signal for performing an operation other than the locking and unlocking with the key to the control device via the second communication module after the authentication.

14 Claims, 11 Drawing Sheets

(51) Int. Cl.
*B60R 25/24* (2013.01)
*H04L 29/06* (2006.01)
*H04W 12/04* (2009.01)
*H04W 12/06* (2009.01)

(52) U.S. Cl.
CPC ......... *H04L 63/0853* (2013.01); *H04W 12/04* (2013.01); *H04W 12/06* (2013.01); *G07C 2009/00769* (2013.01)

(56) References Cited

U.S. PATENT DOCUMENTS

| | | | |
|---|---|---|---|
| 2013/0259232 A1* | 10/2013 | Petel | H04L 63/0492 380/270 |
| 2014/0313009 A1* | 10/2014 | King | G08C 17/02 340/5.61 |
| 2017/0199662 A1* | 7/2017 | Xia | G06F 3/0488 |
| 2018/0215347 A1* | 8/2018 | Weghaus | B60R 25/245 |
| 2018/0370488 A1* | 12/2018 | Schoula | G07C 9/00309 |
| 2019/0206170 A1* | 7/2019 | Sakurada | G06Q 10/0833 |

\* cited by examiner

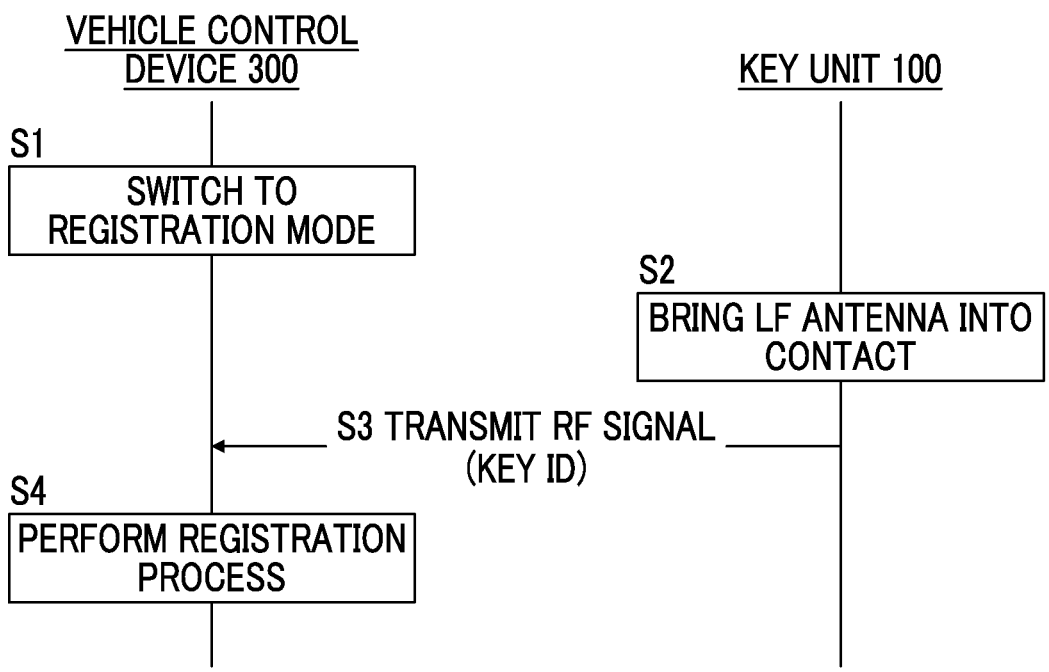
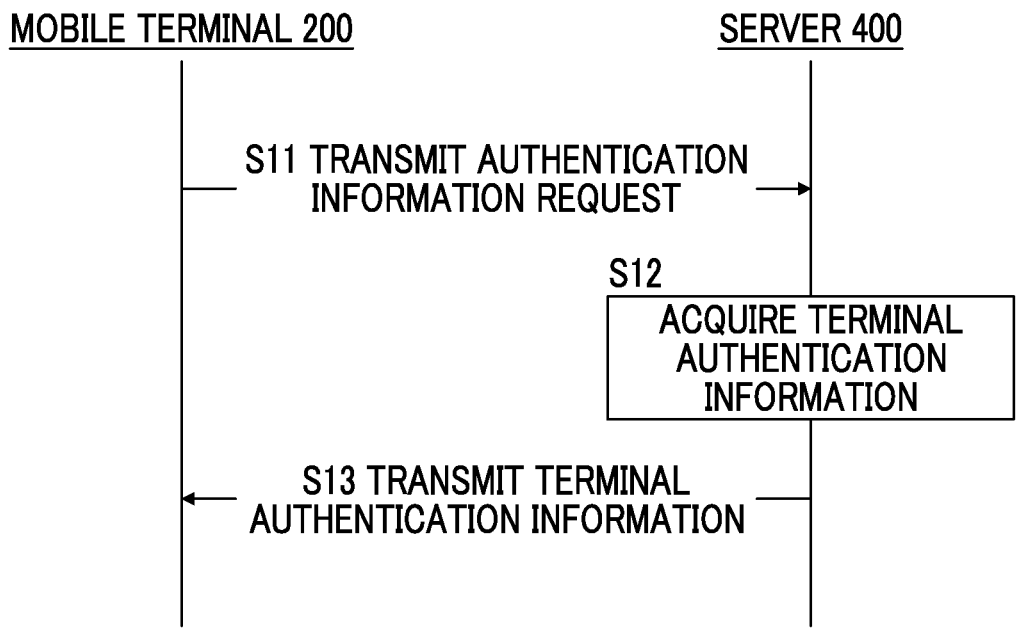

| BUTTON | INPUT METHOD | REQUESTED OPERATION |
|---|---|---|
| (212) | TAP | LOCKING OF DOOR |
| (213) | TAP | UNLOCKING OF DOOR |
| (214) | LONG TAP | CLOSING + LOCKING OF DOOR |
| (215) | LONG TAP | UNLOCKING + OPENING OF DOOR |

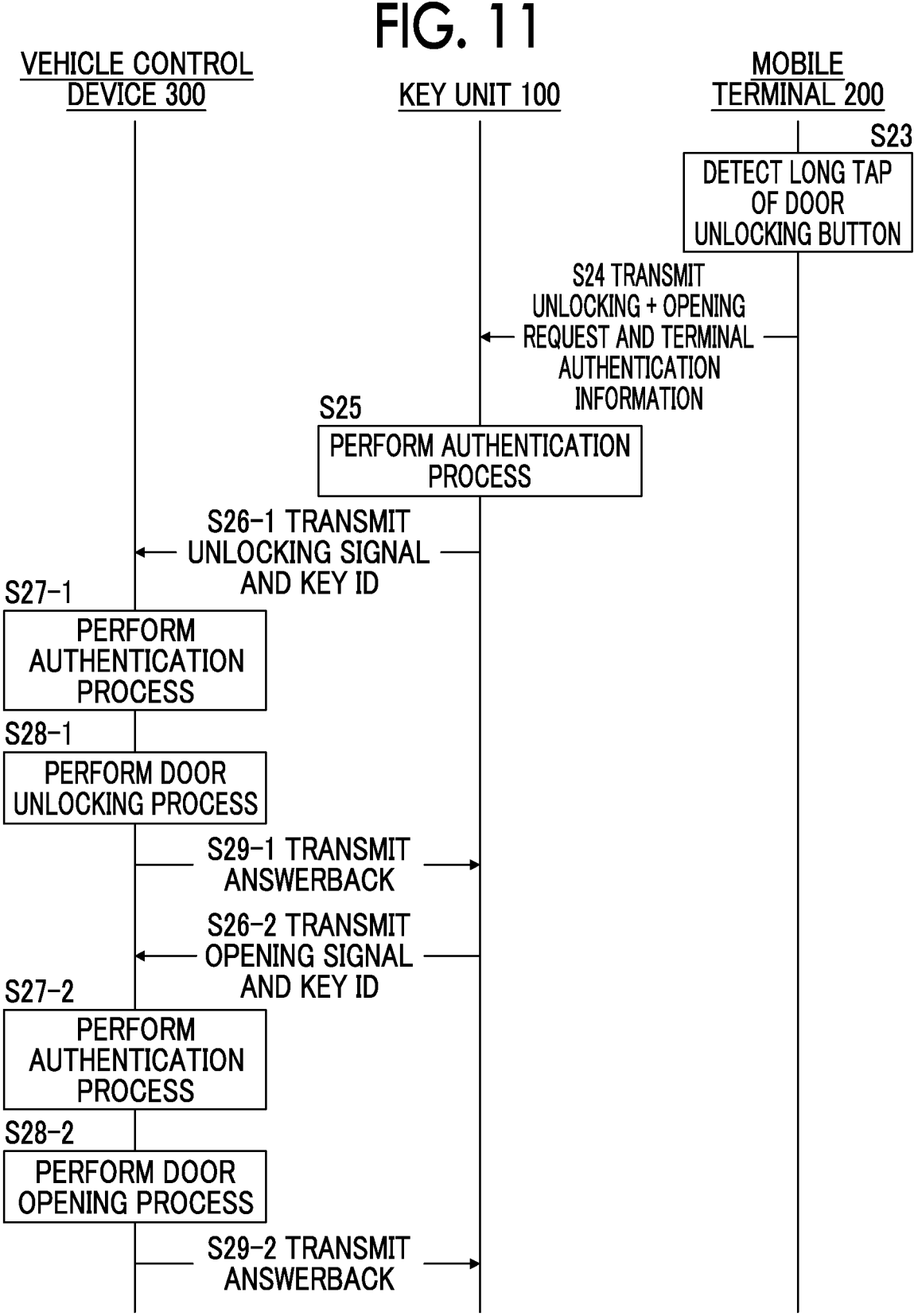

FIG. 12A

| BUTTON | INPUT METHOD | REQUESTED OPERATION |
|---|---|---|
| (212) | TAP | LOCKING OF DOOR |
| (213) | TAP | UNLOCKING OF DOOR |
| (214) | LONG TAP | CLOSING OF DOOR |
| (215) | LONG TAP | UNLOCKING OF DOOR |

FIG. 12B

| BUTTON | INPUT METHOD | REQUESTED OPERATION |
|---|---|---|
| (212) | TAP | LOCKING OF DOOR |
| (213) | TAP | UNLOCKING OF DOOR |
| (214) | LONG TAP | CLOSING OF DOOR |
| (214) | SLIDE | CLOSING + LOCKING OF DOOR |
| (215) | LONG TAP | UNLOCKING OF DOOR |
| (215) | SLIDE | UNLOCKING + OPENING OF DOOR |

KEY UNIT, CONTROL SYSTEM, CONTROL METHOD, AND NON-TRANSITORY COMPUTER-READABLE STORAGE MEDIUM HAVING PROGRAM STORED THEREIN

CROSS-REFERENCE TO RELATED APPLICATIONS

This application claims priority to Japanese Patent Application No. 2017-204751 filed on Oct. 23, 2017, which is incorporated herein by reference in its entirety including the specification, drawings and abstract.

BACKGROUND

1. Technical Field

The disclosure relates to a key unit, a control system, a control method, and a non-transitory computer-readable storage medium having a program stored therein.

2. Description of Related Art

Key management systems in which a mobile terminal can acquire authentication information for locking and unlocking a vehicle from a server via a network and the mobile terminal can be used as an electronic key are known (Japanese Unexamined Patent Application Publication No. 2006-118122 (JP 2006-118122 A) and Japanese Unexamined Patent Application Publication No. 2011-256561 (JP 2011-256561 A)). Such an electronic key can be applied to a facility such as a building as well as a vehicle and can remotely perform locking and unlocking of a vehicle or a facility that does not have a communication function with a server.

SUMMARY

There is demand for a technique for controlling locking and unlocking of a vehicle or a facility that does not have a communication function with a server with a key and other operations using an external device.

The disclosure provides a key unit, a control system, a control method, and a non-transitory computer-readable storage medium having a program stored therein that can control locking and unlocking of a vehicle or a facility that does not have a communication function with a server with a key and other operations using an external device.

A key unit according to a first aspect of the disclosure includes: a first communication module configured to perform radio communication with a user device using a first communication standard; a second communication module configured to perform radio communication with a control device mounted in a vehicle or a facility using a second communication standard which is different from the first communication standard; an authentication unit configured to perform authentication using authentication information when an operation request including the authentication information has been received from the user device via the first communication module; and a control unit configured to perform locking and unlocking of the vehicle or the facility with a key in response to the operation request when the authentication using the authentication information has succeeded and to transmit a control signal for performing an operation other than the locking and unlocking with the key to the control device, via the second communication module after the authentication.

By employing the key unit according to the aspect, a user can control locking and unlocking of a vehicle or a facility with a key and another operation using the user device. At this time, since the user can simultaneously perform the locking and unlocking and the other operation through only one input operation, it is possible to improve convenience for the user.

The "facility" in the aspect is typically a building (a structure) such as a house, a garage, a warehouse, or a factory, and the "facility" also includes equipment included in the structure.

In the aspect, the operation other than the locking and unlocking with the key may include an opening and closing operation of an opening-closing body associated with the key or an operation of starting or stopping equipment in the vehicle or the facility. Examples of the "opening-closing body" include an entrance/exit door, a trunk, and a hood of a vehicle. Examples of the "equipment in the vehicle or the facility" include a lighting device, an air conditioner, a monitoring device, a seat adjusting device, a steering wheel adjusting device, and a mirror adjusting device.

In the aspect, the control unit may be configured to transmit second authentication information stored in advance therein along with the control signal to the control device. The second authentication information is authentication information which is stored in advance in the key unit. In some embodiments, the second authentication information is registered in the control device through a preliminary registration process. The control device may perform an authentication process using the second authentication information and perform control which is required by the key unit when the authentication has succeeded.

In the aspect, the control unit may be configured to transmit a control signal for requesting only locking and unlocking with the key to the control device. In the aspect, the control unit may be configured to transmit only a control signal for controlling locking and unlocking with the key to the control device when the operation request is a first operation request and to transmit a control signal for performing the operation other than locking and unlocking with the key to the control device via the second communication module when the operation request is a second operation request.

According to this configuration, various operations of the vehicle or the facility can be performed.

A control system according to a second aspect of the disclosure includes: a user device; and the key unit according to the first aspect. The user device is configured to transmit the first operation request including the authentication information to the control device mounted in the vehicle or the facility in response to a detection of a first type of input operation and to transmit the second operation request including the authentication information to the control device in response to a detection of a second type of input operation which is different from the first type.

In the aspect, the user device may include a touch panel, and the user device may be configured to transmit the first operation request including the authentication information to the control device when the first type of input operation is performed in a first area of the touch panel and may be configured to transmit the second operation request including the authentication information to the control device when the second type of input operation is performed in a second area different from the first area of the touch panel.

In the aspect, the first type of input operation may be a tap input on the touch panel, and the second type of input operation may be one of a long-tap input, a double-tap input, a slide input, and a gesture input on the touch panel.

In the aspect, the control system may further include a control device, the control unit of the key unit may be configured to transmit second authentication information stored in advance therein along with the control signal to the control device, and the control device may be configured to perform an operation which is indicated by the control signal when authentication using the second authentication information has succeeded.

A third aspect of the disclosure provides a control method for a key unit including a first communication module configured to perform radio communication with a user device using a first communication standard and a second communication module configured to perform radio communication with a control device mounted in a vehicle or a facility using a second communication standard which is different from the first communication standard. The control method includes: receiving an operation request including authentication information from the user device via the first communication module; performing authentication using the authentication information; and performing locking and unlocking of the vehicle or the facility with a key in response to the operation request when the authentication using the authentication information has succeeded and transmitting a control signal for performing an operation other than the locking and unlocking with the key to the control device via the second communication module after the authentication.

A fourth aspect of the disclosure provides a non-transitory computer-readable storage medium having a program stored therein, wherein the program is a program causing a computer to perform the control method according to the third aspect.

The disclosure can be identified as a key unit or a control system including at least a part of the above-mentioned aspects. The disclosure may be identified as a control method of performing the above-mentioned processes, a program causing a computer to perform the control method, or a non-transitory computer-readable storage medium having, the program stored therein. The processes or structure can be freely combined in practice as long as no technical inconsistency arises.

According to the disclosure, it is possible to prevent an erroneous operation in a vehicle operation device and to secure accuracy in operations.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a diagram illustrating a flow of setting, up the key unit 100;

FIG. 7 is a diagram illustrating a flow of setting up the mobile terminal 200;

FIG. 11 is a flow diagram illustrating a flow of data and processes between elements when a door opening button is operated in a modified example;

FIG. 12A is a diagram illustrating a modified example of an input method using an operation button which is displayed on the operation screen 210 and a requesting operation; and FIG. 12B is a diagram illustrating a modified example of an input method using an operation button which is displayed on the operation screen 210 and a requesting operation.

DETAILED DESCRIPTION OF EMBODIMENTS

First Embodiment

Outline of System

Figure 1:
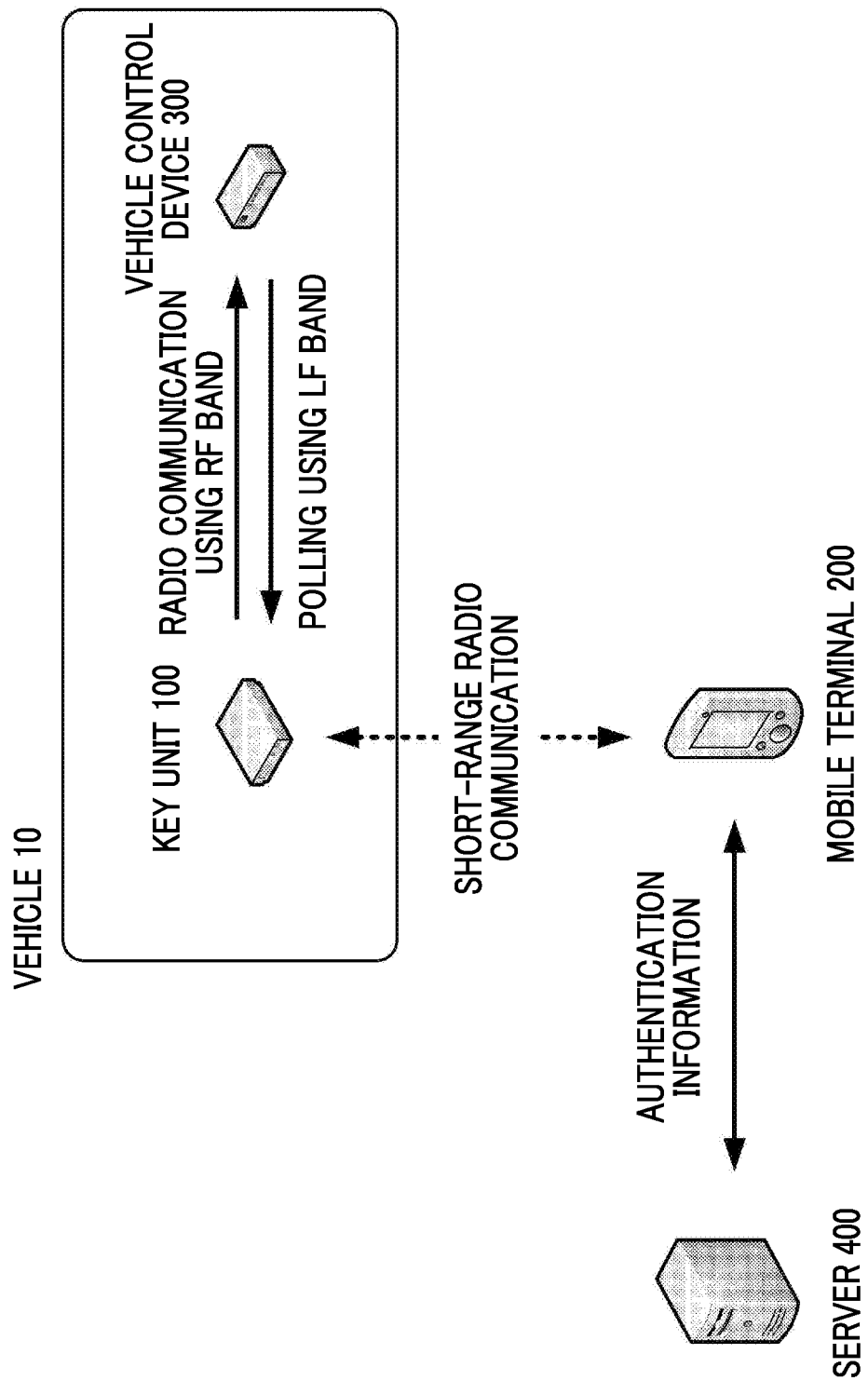
FIG. 1 is a schematic system diagram illustrating a locking/unlocking system according to an embodiment.

The outline of a vehicle control system according to a first embodiment will be described with reference to FIG. 1. The vehicle control system according to this embodiment includes a key unit (a communication device) 100 and a vehicle control device 300 that are mounted in a vehicle, a mobile terminal 200, and a server 400.

In the vehicle control system according to this embodiment, the key unit 100 includes the same radio interface as an electronic key (a portable unit) such as a smart key and can perform locking and unlocking of the vehicle and other vehicle operations without using a physical key by communicating with the vehicle control device 300. The key unit 100 performs short-range radio communication with the mobile terminal 200 and determines whether the key unit operates as an electronic key (a vehicle operation device) of the vehicle 10 based on a result of authentication of the mobile terminal 200. That is, a user of the system can perform locking and unlocking of the vehicle or other vehicle operations by operating the mobile terminal 200 from outside of the vehicle 10.

The vehicle control system according to this embodiment is configured to perform other vehicle operations such as opening and closing of a door as well as locking and unlocking of the vehicle 10. Here, in order to prevent an unintentional vehicle operation from being performed due to a user's erroneous operation of the mobile terminal 200, a proper user interface is used on the mobile terminal 200 in this embodiment.

System Configuration

Figure 2:
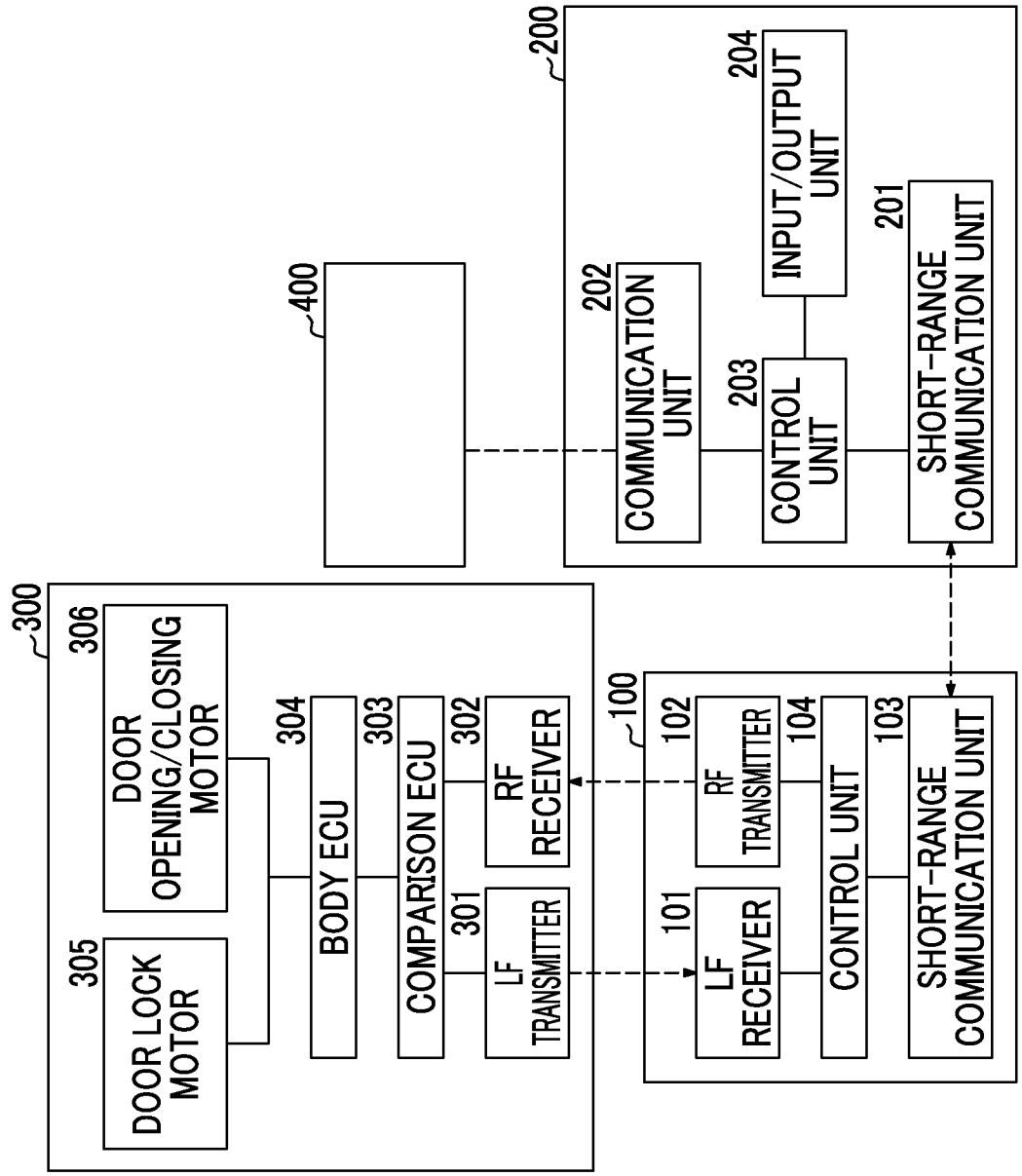
FIG. 2 is a block diagram schematically illustrating an example of elements of the locking/unlocking system.

Elements of the system will be described in detail. FIG. 2 is a block diagram schematically illustrating an example of configurations of the key unit 100, the mobile terminal 200, the vehicle control device 300, and the server 400 which are illustrated in FIG. 1. Among these, the key unit 100 and the vehicle control device 300 are mounted in the vehicle 10 which is to be locked/unlocked (locked and unlocked).

Vehicle Control Device 300

The vehicle control device 300 is a device that locks, unlocks, opens, and closes a door of the vehicle and is a device that constitutes a part of a smart key system. The vehicle control device 300 locks, unlocks, opens, and closes a door of the vehicle 10 based on vehicle control signals which are transmitted from an electronic key (hereinafter referred to as a portable unit) carried by a user of the vehicle using radio waves of a radio frequency (hereinafter abbreviated to RF) band. The vehicle control device 300 also has a function of transmitting radio waves of a low frequency (hereinafter abbreviated to LF) band for searching for the portable unit.

In this embodiment, instead of the portable unit carried by the user, the key unit 100 controls locking, unlocking, opening, and closing of the door of the vehicle by transmitting and receiving radio waves of the RF band and radio waves of the LF band. In the following description, a communication partner of the vehicle control device 300 is limited to the key unit 100 unless mentioned otherwise.

The vehicle control device 300 includes an LF transmitter 301, an RF receiver 302, a comparison ECU 303, a body ECU 304, a door lock motor 305, and a door opening/closing motor 306. The vehicle control device 300 operates with electric power which is supplied from an auxiliary machine battery which is not illustrated and which is mounted in the vehicle 10.

The LF transmitter 301 transmits radio waves of the LF band (for example, 100 KHz to 300 KHz) for searching for (polling) the key unit 100. The LF transmitter 301 is incorporated, for example, in the vicinity of a center console or a steering wheel inside the vehicle.

The RF receiver 302 receives radio waves of the RF band (for example, 100 MHz to 1 GHz) transmitted from the key unit 100. The RF receiver 302 is incorporated inside the vehicle.

The comparison ECU 303 is a computer that performs control for locking, unlocking, opening, and closing the door of the vehicle 10 based on a signal (a locking signal or an unlocking signal) transmitted from the key unit 100 using the radio waves of the RF band. The comparison ECU 303 is constituted, for example, by a microcomputer.

In the following description, signals for instructing the vehicle 10 to unlock, lock, open, and close a door thereof are generically referred to as a vehicle control signal. The vehicle control signal is a signal for instructing the vehicle 10 to perform at least one of locking, unlocking, opening, and closing of the door thereof. Examples of the vehicle control signal include a signal for instructing unlocking of a door, a signal for instructing unlocking and opening of a door, a signal for instructing locking of a door, and a signal for instruction closing and locking of a door.

Figure 3:
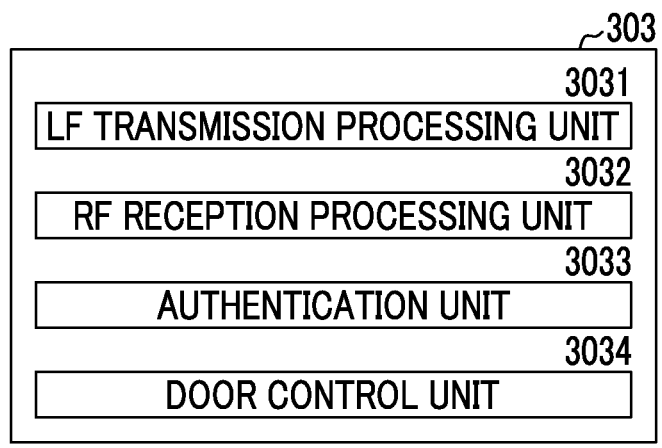
FIG. 3 is a diagram illustrating functional modules which are included in a comparison ECU 303.

Functional modules included in the comparison ECU 303 are illustrated in FIG. 3. The functional modules illustrated in FIG. 3 may be embodied by causing a CPU (not illustrated) to execute a program which is stored in a storage unit (such as a ROM) (not illustrated).

An LF transmission processing unit 3031 performs control for transmitting a polling signal (a request signal) as radio waves of the LF band to the inside of the vehicle via the LF transmitter 301. An RF reception processing unit 3032 performs control for receiving a vehicle control signal transmitted as radio waves of the RF band from the key unit 100 via the RF receiver 302. An authentication unit 3033 ascertains whether the vehicle control signal transmitted from the key unit 100 has been transmitted from a proper device. Specifically, the authentication unit 3033 determines whether a key ID included in the vehicle control signal matches a key ID stored in advance in a storage unit (not illustrated) of the comparison ECU 303. Specific details thereof will be described later.

A door control unit 3034 transmits at least one of an unlocking command, a locking command, an opening command, and a closing command to the body ECU 304 which will be described later based on a result of authentication which has been performed by the authentication unit 3033. The signal is transmitted via an onboard network such as a controller area network (CAN).

The body ECU 304 is a computer that controls the body of the vehicle. The body ECU 304 has a function of unlocking and locking the door of the vehicle or opening and closing the door of the vehicle by controlling the door lock motor 305 or the door opening/closing motor 306 which will be described later based on the command received from the door control unit 3034. The body ECU 304 may additionally have functions of performing control of elements associated with the vehicle body such as power window control, seat adjustment, antitheft, seat belt control, and headlamp control.

The door lock motor 305 is an actuator that locks and unlocks a door of the vehicle 10 (which includes a trunk in addition to an entrance/exit door and a rear gate). The door lock motor 305 operates based on a signal transmitted from the body ECU 304.

The door opening/closing motor 306 is an actuator that opens and closes a door of the vehicle 10 (which includes a trunk in addition to an entrance/exit door and a rear gate). The door opening/closing motor 306 operates based on a signal transmitted from the body ECU 304.

The door control unit 3034 may transmit only information indicating that authentication has succeeded to the body ECU 304 instead of the unlocking command or the locking command. According to this configuration, a locking or unlocking operation can be performed with an action of a user (for example, pushing of an unlocking button or a touch of a door knob) as a trigger.

The comparison ECU 303 may control an object other than the door by communicating with the body ECU 304. The comparison ECU 303 may control starting or stopping of an engine by communication with an engine ECU or may perform other control for the vehicle. That is, a device which is to be operated by the vehicle control device 300 is not particularly limited.

Key Unit 100

The key unit 100 will be described next. The key unit 100 is a communication device that is disposed inside the vehicle 10 and has a function of authenticating a mobile terminal 200 by performing short-range radio communication with the mobile terminal 200 and a function of transmitting a signal for controlling the vehicle 10 using radio waves of the RF band based on a result of authentication of the mobile terminal 200. The key unit 100 includes an LF receiver 101, an RF transmitter 102, a short-range communication unit 103, and a control unit 104.

In this embodiment, the key unit 100 is disposed at a predetermined position (for example, in a glove box) inside the vehicle and operates with electric power which is supplied form an auxiliary machine battery which is not illustrated and which is mounted in the vehicle 10.

The LF receiver 101 receives a polling signal transmitted from the vehicle control device 300 using radio waves of the LF band. The LF receiver 101 includes an antenna for receiving radio waves of the LF band (hereinafter referred to as an LF antenna). The RF transmitter 102 transmits a vehicle control signal to the key unit 100 using radio waves of the RF band. The communication using radio waves of the LF band and radio waves of the RF band is an example of a second communication standard, and the LF receiver 101 and the RF transmitter 102 are examples of a second communication module.

The short-range communication unit 103 communicates with a mobile terminal 200 carried by a user. The short-range communication unit 103 performs communication in a short range (at a distance at which the interior and the exterior of the vehicle can communicate with each other) using a predetermined radio communication standard (a first communication standard). The short-range communication unit 103 is an example of a first communication module.

In this embodiment, the short-range communication unit 103 performs data communication based on a Bluetooth (registered trademark) low energy standard (hereinafter referred to as BLE). BLE is a low-energy communication standard using Bluetooth, and is characterized in that communication can be started immediately when a communication partner is detected without requiring pairing between devices. In this embodiment, BLE is exemplified, but another radio communication standard can also be used. For example, near field communication (NFC), ultra wideband (UWB), or WiFi (registered trademark) may be used.

The control unit 104 is a computer that performs short-range radio communication with the mobile terminal 200 and performs control for authenticating the mobile terminal 200 and control for transmitting a vehicle control signal based on a result of the authentication. The control unit 104 is constituted, for example, by a microcomputer.

Figure 4:
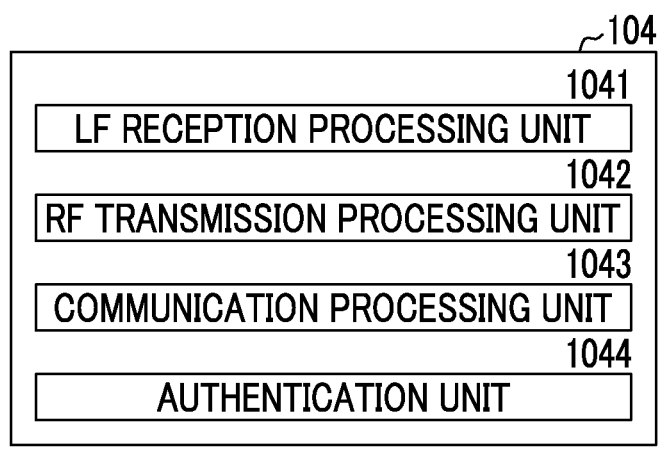
FIG. 4 is a diagram illustrating functional modules which are included in a control unit 104 of a key unit 100.

Functional modules included in the control unit 104 are illustrated in FIG. 4. The functional modules illustrated in FIG. 4 may be embodied by causing a CPU (not illustrated) to execute a program stored in a storage unit (such as a ROM) (not illustrated).

An LF reception processing unit 1041 performs control for receiving a polling signal transmitted as radio waves of the LF band from the vehicle control device 300 via the LF receiver 101.

An RF transmission processing unit 1042 performs control for transmitting a vehicle control signal as radio waves of the RF band via the RF transmitter 102. The vehicle control signal is generated by a communication processing unit 1043 which will be described later when an authentication unit 1044 which will be described later has succeeded in authentication of the mobile terminal 200.

The communication processing unit 1043 processes communication with the mobile terminal 200 via the short-range communication unit 103. Specifically, the communication processing unit 1043 receives a request for requesting locking, unlocking, opening, or closing of a door (hereinafter generically referred to as a control request) from the mobile terminal 200 and generates a vehicle control signal in response to the received request. The generated vehicle control signal is temporarily stored and is output at a time at which the authentication unit 1044 which will be described later succeeds in authentication of the mobile terminal 200.

The authentication unit 1044 authenticates the mobile terminal 200 based on authentication information included in the control request transmitted from the mobile terminal 200. Specifically, the authentication unit 1044 compares the authentication information transmitted from the mobile terminal 200 with authentication information stored in a storage unit which is not illustrated and determines that the authentication has succeeded when they match. When the authentication information does not match, the authentication unit 1044 determines that the authentication fails. When the authentication of the mobile terminal 200 by the authentication unit 1044 has succeeded, a vehicle control signal generated by the communication processing unit 1043 is output to the RF transmission processing unit 1042 and is wirelessly transmitted to the vehicle control device 300.

The method of authentication performed by the authentication unit 1044 may be a method of simply comparing authentication information and verifying identity therebetween or may be a method using an asymmetric cipher.

In the following description, the authentication information stored in the key unit 100 is referred to as device authentication information and the authentication information transmitted from the mobile terminal 200 is referred to as terminal authentication information, if necessary.

In this embodiment, the authentication unit 1044 generates a transmission trigger of a vehicle control signal, but the authentication unit 1044 may control a power supply of the key unit 100 based on an authentication state. For example, all elements other than the communication processing unit 1043 and the authentication unit 1044 may be set to a suspended state in a state in which authentication of the mobile terminal 200 is not performed, and all elements may be set to an electrically connected state in a predetermined period (for example, until a response to a transmitted vehicle control signal is transmitted from the vehicle control device 300) when the authentication has succeeded. As long as a vehicle control signal can be transmitted only when authentication has succeeded, the implementation method thereof is not particularly limited.

The key unit 100 (the RF transmitter 102) transmits an ID of an electronic key (hereinafter referred to as a key ID) along with a vehicle control signal to the vehicle control device 300. The key ID may be stored in the key unit 100 in a plaintext state in advance or may be stored in a state in which it is encrypted using a cypher specific to the mobile terminal 200. When the key ID is stored in the encrypted state, the encrypted key ID may be decrypted using authentication information transmitted from the mobile terminal 200 to acquire the original key ID.

Mobile Terminal 200

The mobile terminal 200 will be described next. Since the mobile terminal 200 is a device which is used by a user, the mobile terminal 200 may also be referred to as a user device in this specification.

The mobile terminal 200 is a small computer such as a smartphone, a mobile phone, a tablet terminal, a personal digital assistant (PDA), or a wearable computer (such as a smart watch). The mobile terminal 200 includes a short-range communication unit 201, a communication unit 202, a control unit 203, and an input/output unit 204.

The short-range communication unit 201 performs communication with the key unit 100 based on the same communication standard as the short-range communication unit 103.

The communication unit 202 connects the mobile terminal 200 to a network. In this embodiment, the mobile terminal can communicate with another device (for example, the server 400) via a network using a mobile communication service such as 3G or LTE.

Figure 5:
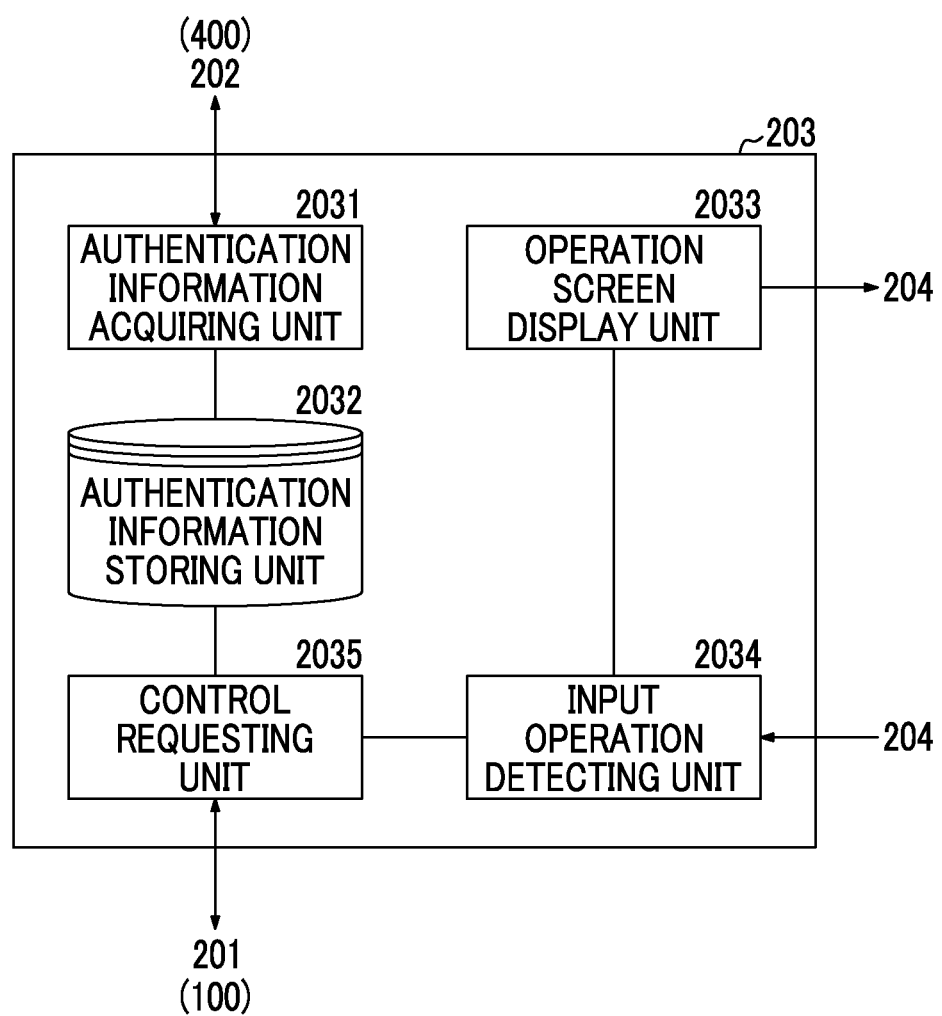
FIG. 5 is a diagram illustrating functional modules which are included in a control unit 203 of a mobile terminal 200.

The control unit 203 is a computer that takes charge of control of the mobile terminal 200. The control unit 203 may realize functions illustrated in FIG. 5 by causing a CPU (not illustrated) to execute a program stored in a storage unit (such as a ROM) (not illustrated). That is, the control unit 203 serves as an authentication information acquiring unit 2031, an authentication information storing unit 2032, an operation screen display unit 2033, an input operation detecting unit 2034, and a control requesting unit 2035. Some or all of the functions may be realized by a dedicated logical circuit. The control unit 203 performs, for example, a process of generating a vehicle control request, a process of acquiring the terminal authentication information, a process of displaying a screen of a user interface, a process of detecting an input operation from a user, and a process of transmitting the vehicle control request and the terminal authentication information to the key unit 100.

The control unit 203 performs an interaction with the user via the input/output unit 204. The input/output unit 204 receives an input operation from the user and presents information to the user. Specifically, the input/output unit 204 includes a touch panel and control unit thereof and a liquid crystal display and control unit thereof. The touch panel and the liquid crystal display are embodied as a single touch screen (a touch panel display) in this embodiment.

The authentication information acquiring unit 2031 performs a process of acquiring terminal authentication information. In this embodiment, the terminal authentication information is generated by the server 400 and the authentication information acquiring unit 2031 acquires the terminal authentication information from the server 400 via the communication unit 202. The authentication information acquiring unit 2031 stores the acquired terminal authentication information in the authentication information storing unit 2032.

The terminal authentication information acquired by the authentication information acquiring unit 2031 may be an invariable key or a one-time key. In any case, device authentication information corresponding to the terminal authentication information is stored in the key unit 100 in advance.

The operation screen display unit 2033 displays an operation screen on the input/output unit 204. The input operation detecting unit 2034 detects an operation which has been performed on the input/output unit 204 by a user. Since the input/output unit 204 is a touch screen as described above, the input operation detecting unit 2034 acquires a position on the screen which has been operated by the user and a type of the input operation. Examples of the type of the input operation include a tap input (short press), a long-tap input (long press), a double-tap input, a slide input, and a gesture input.

The control requesting unit 2035 transmits a control request for controlling the vehicle to the key unit 100 via the short-range communication unit 201 based on details of the user operation detected by the input operation detecting unit 2034. At this time, the control requesting unit 2035 performs control so that the terminal authentication information stored in the authentication information storing unit 2032 is included in the control request and then the control request is transmitted to the key unit 100. When the mobile terminal 200 does not have terminal authentication information, the control unit 203 may prohibit an operation of the vehicle 10 from the operation screen.

Specific Example of User Interface

For example, the operation screen which is presented to the user or a correlation between the input operation of the user and the control request for the vehicle 10 will be described later in detail.

Operation of System

Outline of Operation of Vehicle Control Device

Before starting detailed description of the system, the outline of the operation which is performed by a vehicle control device 300 will be described. The vehicle control device 300 is a device that constitutes a smart key system in the related art and detects that a key unit 100 is located in the vicinity of the vehicle or inside the vehicle by communicating with the key unit 100 carried by the user.

Specifically, the comparison ECU 303 transmits a polling signal to the interior and exterior of the vehicle via the LF transmitter 301 at predetermined time intervals, and receives a response signal transmitted from the key unit 100 in response to the polling signal. The response signal includes a key ID specific to the key unit 100, the registered key ID of the key unit 100 is stored in the comparison ECU 303, and the comparison ECU 303 performs a process of authenticating the key unit 100 using the received key ID and the stored key ID. When authentication of the key unit 100 has succeeded, a notification indicating this fact is transmitted to the body ECU 304 and thus the vehicle can be made to perform a predetermined operation (for example, unlocking of a door or releasing of an immobilizer).

Process of Registering Key Unit in Vehicle Control Device

An operation of registering the key ID of the key unit 100 in the vehicle control device 300 will be described now. This operation is performed by a maker of the vehicle, a maintenance service provider, or an owner of the vehicle. A flow of the operation will now be described with reference to FIG. 6.

First, in Step S1, the vehicle control device 300 performs transition to a mode in which a new key ID is registered. At this time, the vehicle control device 300 may request communication with a device registered in advance (for example, a smart key having a key ID stored in advance). Accordingly, the vehicle control device 300 can ascertain whether a person who performs a registration operation is a rightful owner of the vehicle. When transition to the registration mode is performed, the vehicle control device 300 supplies a registration signal from the LF transmitter 301.

Then, in Step S2, the user brings the LF antenna of the key unit 100 into actual or substantial contact with an antenna coil (which is typically incorporated in the vicinity of a push start switch) which is not illustrated and which is included in the vehicle control device 300. Accordingly, electric power is supplied from the antenna coil to the key unit 100 by electromagnetic induction, and the key unit 100 transmits the key ID to the vehicle control device 300 (Step S3). This operation is known as an operation for registering a key ID on the vehicle side (which is generally referred to as transponder communication) in a smart key system for a vehicle. The transmitted key ID is received by the vehicle control device 300 and is registered as a valid key ID (Step S4). That is, the vehicle control device and the key unit are correlated with each other.

Communication and processes which are performed between the vehicle control device 300 and the key unit 100 have been described above.

Process of Acquiring Terminal Authentication Information of Mobile Terminal

An operation of the vehicle control system according to this embodiment will be described with reference to FIG. 7. FIG. 7 is a flow diagram illustrating a flow of data which is transmitted and received between the elements and a flow of processes which are performed by the elements.

First, in Step S11, the mobile terminal 200 requests the server 400 to issue terminal authentication information. The terminal authentication information mentioned here is not information which is used for the vehicle control device 300 to authenticate the key unit 100, but is information which is used for the key unit 100 to authenticate the mobile terminal 200.

When the mobile terminal 200 transmits information for identifying the mobile terminal to the server 400, the server 400 acquires terminal authentication information specific to the mobile terminal 200 (Step S12) and transmits the acquired terminal authentication information to the mobile terminal 200 (Step S13). Accordingly, an operation of unlocking the vehicle 10 can be performed using the mobile terminal 200.

Vehicle Control Process Using Mobile Terminal

Figure 8:
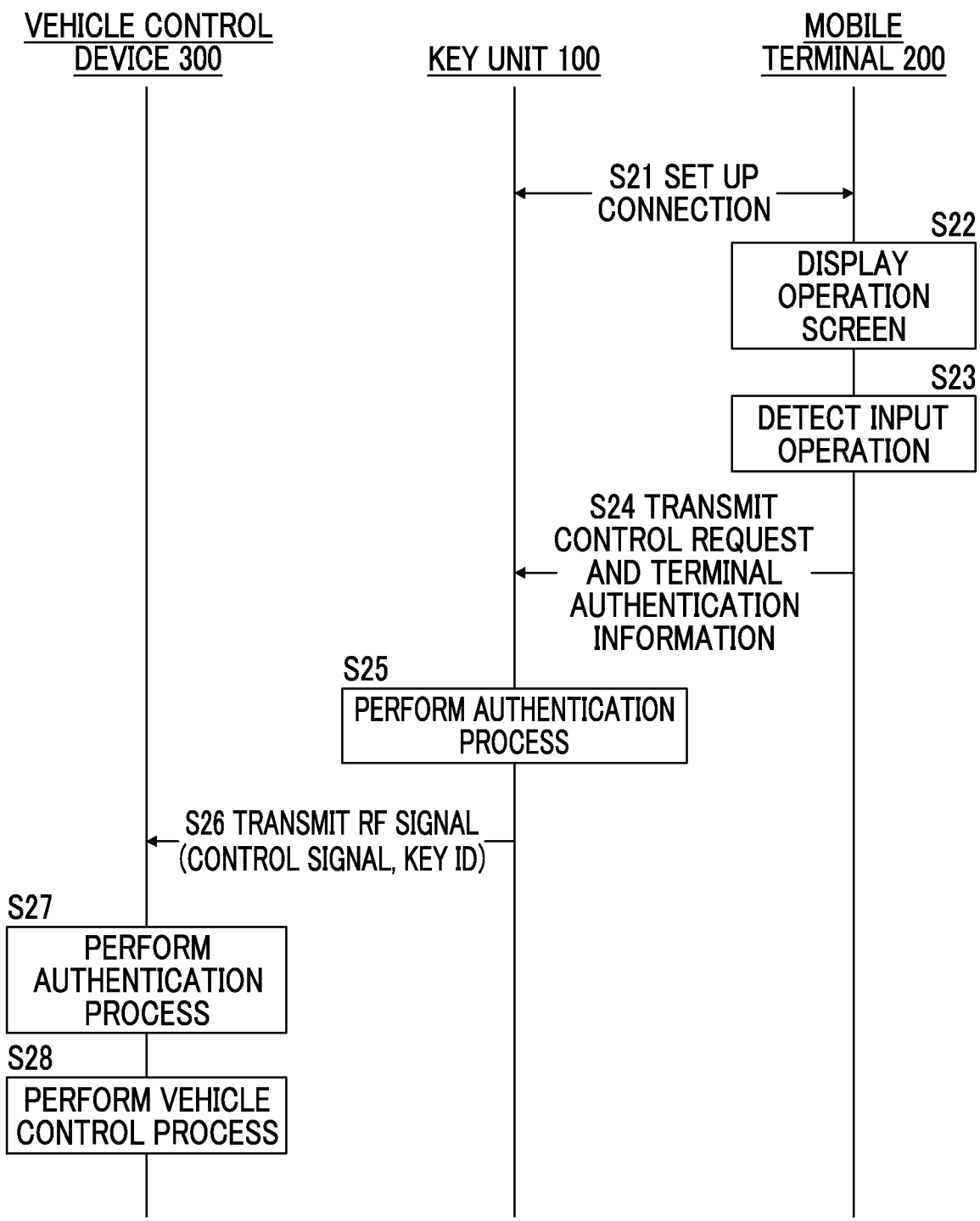
FIG. 8 is a flow diagram illustrating a flow of data and processes between elements.
Figures 9A, 9B:
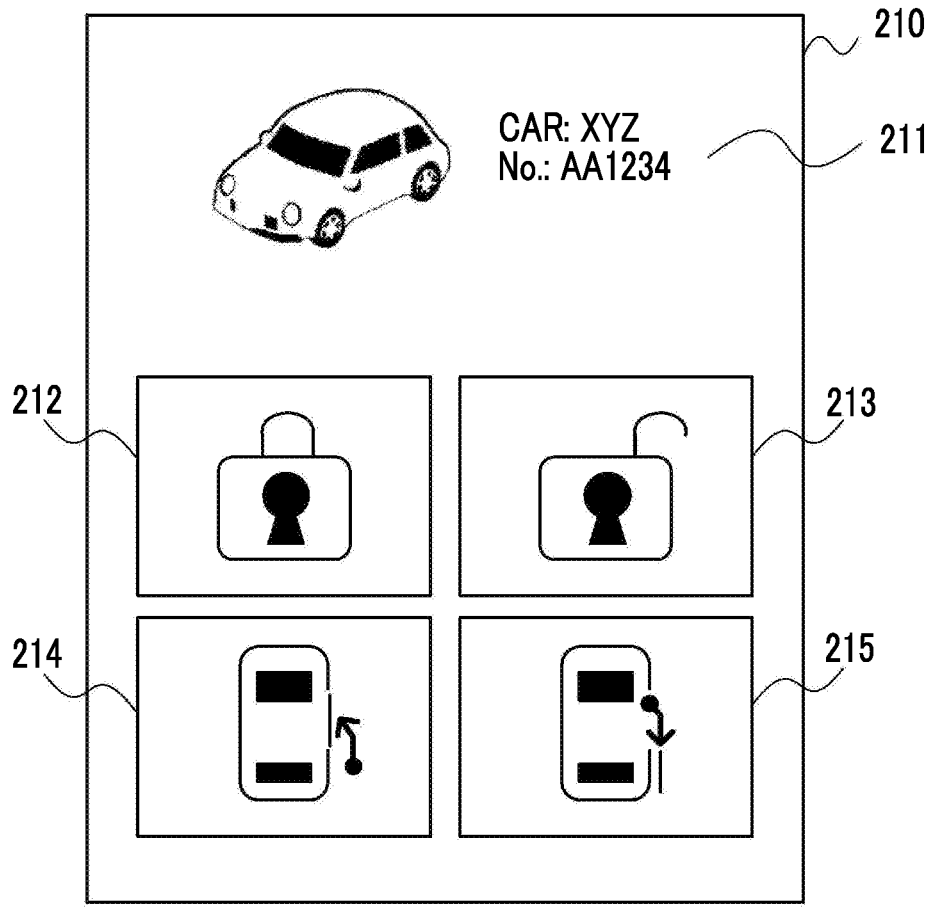
FIG. 9A is a diagram illustrating an example of an operation screen 210 which is displayed on a mobile terminal.
FIG. 9B is a diagram illustrating an example of an input method using an operation button which is displayed on the operation screen 210 and a requesting operation.
Figure 10A:
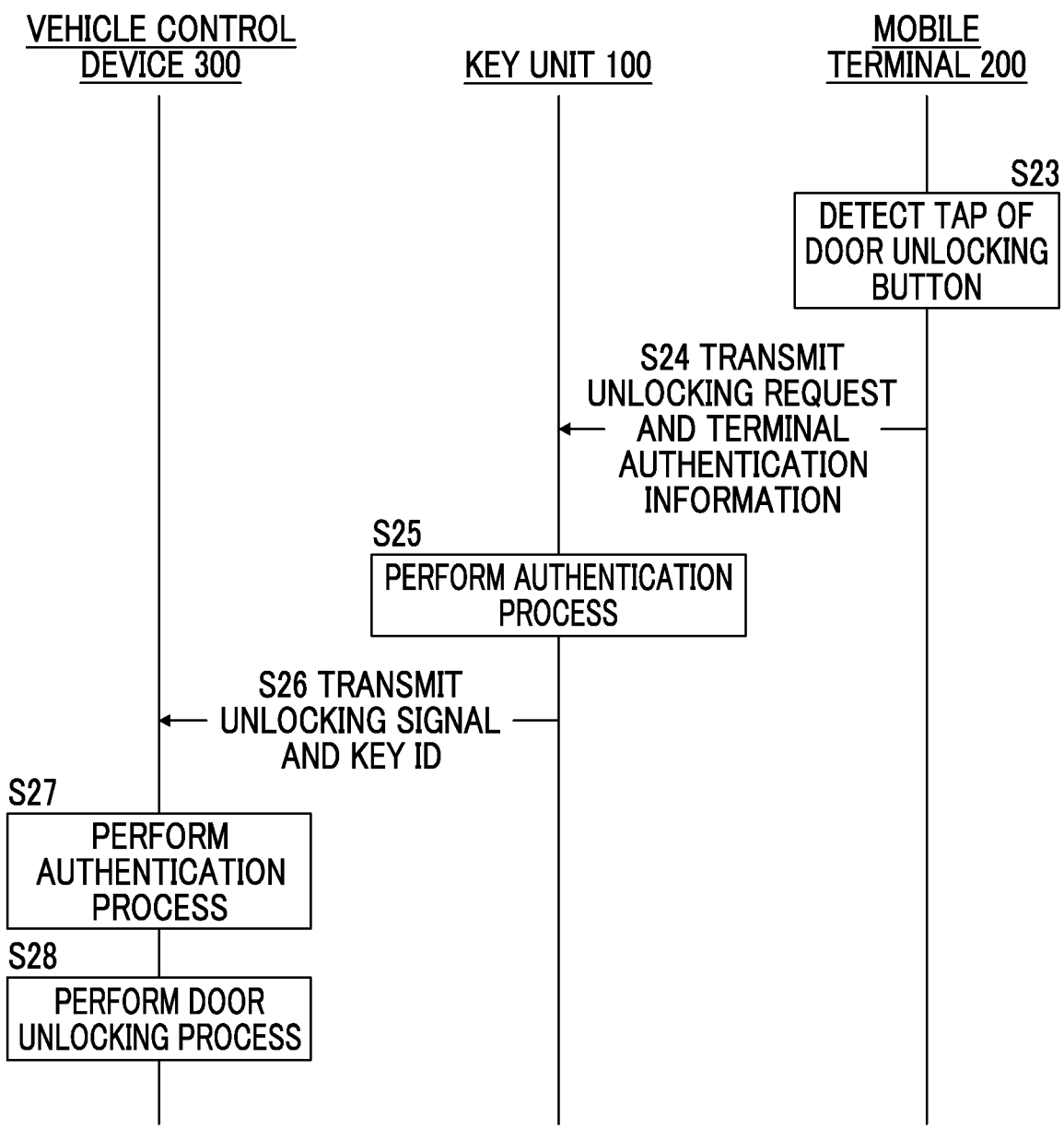
FIG. 10A is a flow diagram illustrating a flow of data and processes between elements when a door unlocking button is operated.
Figure 10B:
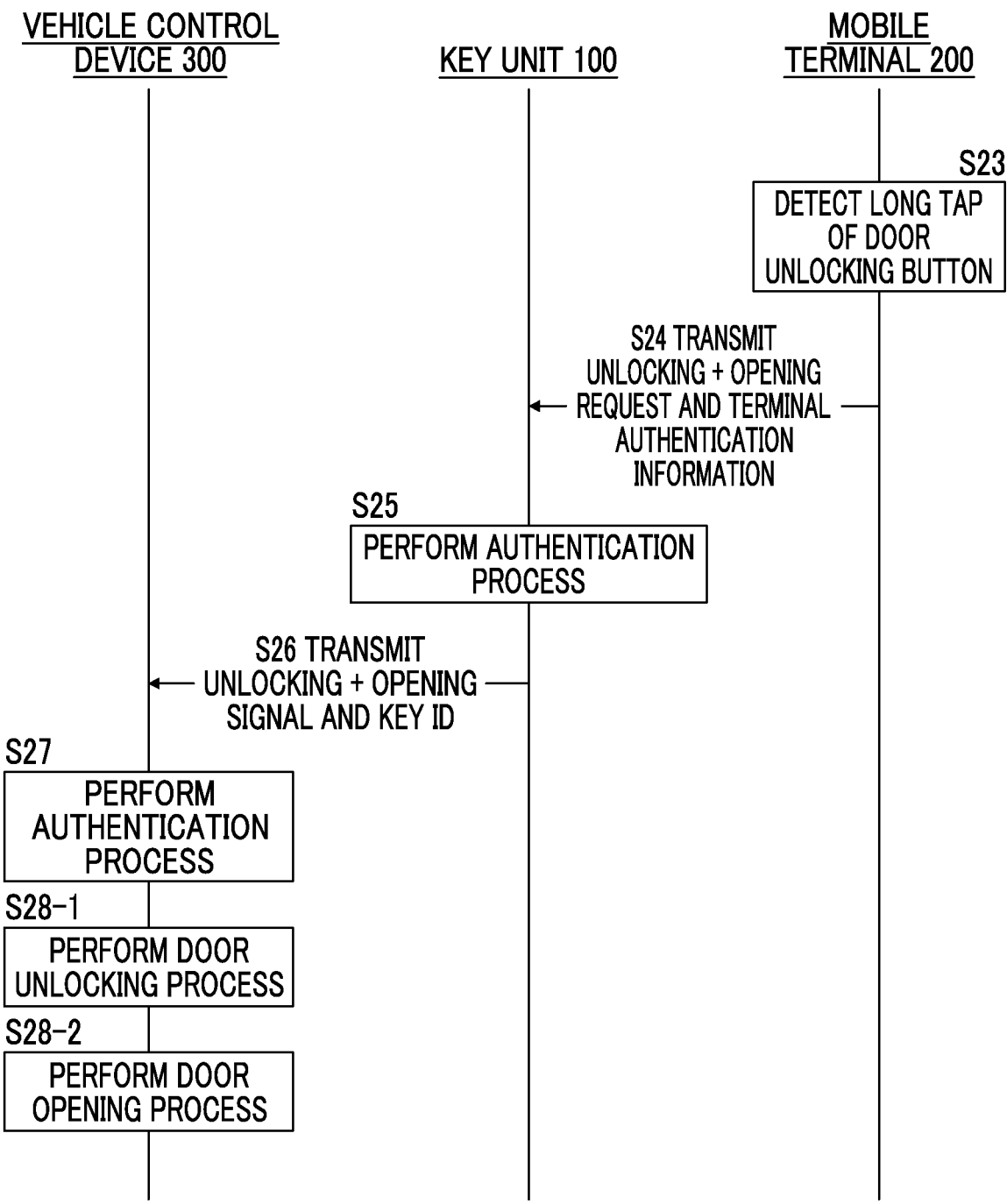
FIG. 10B is a flow diagram illustrating a flow of data and processes between elements when a door opening button is operated.

A flow of processes when a user performs vehicle control using the mobile terminal 200 in this embodiment will be described with reference to FIGS. 8 to 10B. FIG. 8 is a flow diagram illustrating a flow of data which is transmitted and received between the elements and a flow of processes which are performed by the elements. FIG. 9A is a diagram illustrating an example of a display screen of the mobile terminal 200. FIG. 9B is a diagram illustrating an example of vehicle operations and input methods allocated to operation buttons on the display screen. FIG. 10A is a flow diagram illustrating a control flow when a user requests unlocking of a door, and FIG. 10B is a flow diagram illustrating a control flow when a user requests unlocking and opening of a door.

When the mobile terminal 200 enters a communication range of short-range communication (for example, BLE) of the key unit 100, a process of setting up communication between the short-range communication unit 201 of the mobile terminal 200 and the short-range communication unit 103 of the key unit 100 is performed in Step S21. By detecting setup of communication with the key unit 100, the control unit 203 of the mobile terminal 200 can determine that it can control the vehicle 10 correlated with the key unit 100.

In Step S22, the operation screen display unit 2033 displays an operation screen 210 for operating the vehicle 10 on a touch screen 204. FIG. 9A is a diagram illustrating an example of the operation screen 210 according to this embodiment. As illustrated in FIG. 9A, the operation screen 210 includes information 211 for identifying the vehicle 10 to be operated and four operation buttons (UI elements) 212 to 215. The information 211 for identifying the vehicle 10 includes at least one of an appearance, a model, and a vehicle number of the vehicle 10. The operation buttons include a door locking button 212, a door unlocking button 213, a door closing button 214, and a door opening button 215.

When the user of the mobile terminal 200 performs an input operation on the touch screen 204, the input operation detecting unit 2034 detects the input operation of the user in Step S23. The input operation detecting unit 2034 acquires an operation position and an input operation type of the input operation of the user. The operation position is a position on a screen which is operated by the user. Examples of the input operation type include a tap input (short press), a long-tap input (long press), a double-tap input, a slide input, and a gesture input. The gesture input is an input of causing a touch position to move along a predetermined locus.

In Step S24, the control requesting unit 2035 transmits a vehicle control request based on the input operation of the user to the key unit 100 along with the terminal authentication information. In this embodiment, in order to request operations using the operation buttons 212 to 215 included in the operation screen 210, the user needs to perform an input operation of a predetermined input type corresponding to the operation buttons. FIG. 9B is a diagram illustrating an example of input methods (input types) and vehicle operations allocated to the operation buttons. When a tap input is performed on the door locking button 212, the control requesting unit 2035 requests the vehicle to lock the door. When a tap input is performed on the door unlocking button 213, the control requesting unit 2035 requests the vehicle to unlock the door. On the other hand, when a long-tap input is performed on the door closing button 214, the control requesting unit 2035 requests the vehicle to close and lock the door. Similarly, when a long-tap input is performed on the door opening button 215, the control requesting unit 2035 requests the vehicle to unlock and open the door. The door closing button 214 and the door opening button 215 do not respond to tap input and the control requesting unit 2035 does not perform any operation in response thereto.

The control requesting unit 2035 determines whether the input operation of the user satisfies conditions based on the operation position and the operation type of the input operation of the user, and transmits a vehicle operation request corresponding to the input operation to the key unit 100 via the short-range communication unit 201 when the conditions are satisfied.

For example, when the operation position of the input operation of the user is in an area of the door unlocking button 213 (a first UI element) and the input type is a tap input, the control requesting unit 2035 transmits a door unlocking request to the key unit 100. Here, unlocking of a door is an example of a first operation in the claims, and the unlocking request is an example of a control request for requesting the vehicle to perform the first operation.

When the operation position of the input operation of the user is in an area of the door opening button 215 (a second UI element) and the input type is a long-tap input, the control requesting unit 2035 transmits a door unlocking+opening request (a request for unlocking and opening a door) to the key unit 100. Here, the operation including both unlocking and opening of a door is an example of a second operation in the claims, and the unlocking+opening request is an example of a control request for requesting the vehicle to perform the second operation.

The control requesting unit 2035 transmits the terminal authentication information to the key unit 100 at the same time at which the vehicle operation request is transmitted. The terminal authentication information is acquired from the server 400 by the authentication information acquiring unit 2031 and is stored in the authentication information storing unit 2032.

When the key unit 100 receives a control request and terminal authentication information from the mobile terminal 200 via the short-range communication unit 103, the authentication unit 1044 of the key unit 100 compares the received terminal authentication information with device authentication information stored in advance to perform the authentication process in Step S25. When the authentication has succeeded, the key unit 100 transmits a vehicle control signal and a key ID to the vehicle control device 300 via the RF transmitter 102 in Step S26. For example, the key unit 100 transmits a door unlocking control signal when the vehicle control request includes a door unlocking request, and the key unit 100 transmits a door opening control signal when the vehicle control request includes a door opening request.

When the vehicle control device 300 receives the vehicle control signal and the key ID from the key unit 100 via the RF receiver 302, the comparison ECU 303 performs an authentication process based on the received key ID in Step S27. When the authentication has succeeded, the body ECU 304 performs an operation of the vehicle 10 based on the vehicle control signal in Step S28. Specifically, when the vehicle control signal is a door unlocking control signal, the body ECU 304 controls the door lock motor 305 so that the door of the vehicle 10 is unlocked. When the vehicle control signal is a door opening control signal, the body ECU 304 controls the door opening/closing motor 306 so that the door of the vehicle 10 is opened. At this time, answerback or the like may be performed.

FIGS. 10A and 10B are diagrams illustrating a specific flow of processes when a user performs a specific process.

FIG. 10A is a diagram illustrating a flow of processes when a user performs a tap input on the door unlocking button 213 on the operation screen 210. When a tap input on the door unlocking button 213 is detected (S23), the mobile terminal 200 transmits an unlocking request along with the terminal authentication information to the key unit 100 (S24). The key unit 100 performs an authentication process using the terminal authentication information (S25), and transmits a vehicle control signal instructing unlocking of a door to the vehicle control device 300 along with the key ID (S26) when the authentication has succeeded. The vehicle control device 300 performs an authentication process using the key ID (S27), and the body ECU 304 controls the door lock motor 305 so that the door of the vehicle 10 is unlocked when the authentication has succeeded (S28). The flow of processes when the user performs a tap input on the door locking button 212 on the operation screen 210 is the same as described above.

FIG. 10B is a diagram illustrating a flow of processes when the user performs a long-tap input on the door opening button 215 on the operation screen 210. When a long-tap input on the door opening button 215 is detected (S23), the mobile terminal 200 transmits an unlocking+opening request along with the terminal authentication information to the key unit 100 (S24). The key unit 100 performs an authentication process using the terminal authentication information (S25), and transmits a vehicle control signal instructing unlocking and opening of a door to the vehicle control device 300 along with the key ID (S26) when the authentication has succeeded. The vehicle control device 300 performs an authentication process using the key ID (S27). When the authentication has succeeded, the body ECU 304 controls the door lock motor 305 so that the door of the vehicle 10 is unlocked (S28-1) and then controls the door opening/closing motor 306 so that the door is opened (S28-2). The flow of processes when the user performs a long-tap input on the door closing button 214 on the operation screen 210 is the same as described above.

In the case in which the door is already unlocked when the door unlocking+opening signal has been received, the vehicle control device 300 can perform only the process of opening the door.

Advantageous Effects

In this embodiment, an input type on a touch screen by a user differs depending on operation details on the vehicle. That is, unlocking and locking of a door can be realized by a tap operation on the touch screen, but a long-tap input needs to be performed to open and close the door. According to this configuration, it is possible to prevent a door from being opened or closed by a user's unintentional operation. In this embodiment, a long-tap input is required for opening and closing of a door based on a design idea that the door moves physically in opening or closing of the door and thus unintentional control is less useful than in locking or unlocking.

In this embodiment, a vehicle 10 can be made to perform two operations of unlocking and opening of a door by one input operation from a user. Since the user does not need to perform two input operations, it is possible to improve convenience for the user.

Modified Example 1

In the above description, a tap input is required for locking and unlocking of a door and a long-tap input is required for opening and closing of the door, but which input type is required for certain control can be appropriately determined depending on requirements for the system or design ideas. Typically, a more complicated input type can be allocated to an operation of which an erroneous operation has to be prevented. Accordingly, a long-tap input and a slide input may be used together instead of using a tap input and a long-tap input together. When it is intended to prevent an erroneous locking/unlocking operation more than opening/ closing of a door, a tap input may be allocated to opening/ closing of a door and a long-tap input may be allocated to locking/unlocking of a door.

Modified Example 2

Buttons (UI elements) corresponding to operations which can be instructed by a user are displayed on the operation screen 210 according to the above-mentioned embodiment, but UI elements displayed on the operation screen 210 may not be buttons. For example, a schematic image of a vehicle (for example, a top image of a vehicle) may be displayed on the operation screen 210, and an operation which the vehicle has to perform may be determined depending on a position on the touch screen on which the input operation is performed by a user. For example, when a tap input is performed in a screen area corresponding to a door, it may be determined that unlocking or locking of the door has been requested. When a long-tap input is performed in a screen area corresponding to a door, it may be determined that opening or closing of the door has been requested.

Modified Example 3

Unlocking and opening of a door are performed when the door opening button 215 has been operated, but a specific implementation method thereof is not limited to the above-mentioned method (see FIG. 10B). For example, it may be implemented through a flow of processes illustrated in FIG. 11. That is, first, the key unit 100 transmits an unlocking signal of a door to the vehicle control device 300 (S26-1), and the vehicle control device 300 performs an authentication process (S27-1) and a door unlocking process (S28-1) and transmits answerback to the key unit 100 (S29-1). The key unit 100 may transmit a door opening signal after receiving the answerback (S26-2), and the vehicle control device 300 may perform a door opening process in the same way as described above (S27-2 to S29-2). Through, this flow of processes, the same processes as in the above-mentioned embodiment can be implemented. A combination of the unlocking signal and the opening signal in this modified example is an example of a "control signal for performing locking/unlocking using a key and performing an operation other than the locking/unlocking using the key after authentication" in the claims. "After authentication" may be before or after a locking/unlocking process using a key. As another implementation method, a method of causing the mobile terminal 200 to separately transmit an unlocking request and an opening request when the door opening button 215 has been operated can be employed.

Modified Example 4

In the above-mentioned embodiment, unlocking and opening of a door are performed when a user operates the door opening button 215, but only opening of a door may be performed when a user operates the door opening button 215.

FIG. 12A is a diagram illustrating a correlation between operation buttons and requested operations in this modified example. In this modified example, when the door locking button 212 and the door unlocking button 213 are operated, the mobile terminal 200 transmits a vehicle control signal for performing locking and unlocking of a door of the vehicle 10 (a control request for requesting the vehicle to perform a first operation) to the key unit 100. On the other hand, when the door closing button 214 and the door opening button 215 are operated, the mobile terminal 200 transmits a vehicle control signal for performing closing and opening of a door of the vehicle (a control request for requesting the vehicle to perform a second operation) to the key unit 100. In this way, the second operation may not include locking or unlocking of a door and may include only an operation other than the door locking and unlocking operations.

Modified Example 5

In the above-mentioned embodiment, vehicle operations which are performed when the operation buttons 212 to 215 are operated are fixed, but a plurality of input types may be set for one operation button and different types of vehicle operations may be performed depending on input types.

FIG. 12B is a diagram illustrating a correlation between operation buttons and requested operations in this modified example. In this modified example, only a door closing operation may be performed when a long-tap input is performed on the door closing button 214, and a door closing+locking operation may be performed when a slide input is performed on the same door closing button 214.

A door may be opened when a slide input is performed in one direction (for example, downward) on a certain button, and the door may be closed when a slide input is performed in the opposite direction (for example, upward) on the operation button. Three or more input types may be allocated to a single operation button and may be correlated with different requested operations.

Modified Example 6

The door locking button 212 and the door unlocking button 213 are displayed together on the operation screen 210 in the above-mentioned embodiment. Here, the mobile terminal 200 may acquire a locking state of a door (whether the door is in a locked state or in an unlocked state) by communicating with the vehicle 10 (the vehicle control device 300) and may display only one of the door locking button 212 and the door unlocking button 213 depending on the locking state of the door. Similarly, the mobile terminal 200 may acquire an opening state of a door (whether the door is in an opened state or in a closed state) and may display only one of the door closing button 214 and the door opening button 215 depending on the opening state of the door.

An operation button to be displayed may be determined in consideration of both the locking state and the opening state of the door. For example, when the door is unlocked and closed, the door locking button 212 and the door opening button 215 may be displayed. When the door is unlocked and opened, only the door closing button 214 may be displayed. When the door is locked (and closed), only the door unlocking button 213 may be displayed.

Instead of switching an operation button between display and non-display, an operation button may be switched between validity (enabled) and invalidity (disabled).

Modified Example 7

In the above description, an operation object is a slide door of the vehicle 10, but an operation object is not limited thereto. An opening-closing body such as a door, a hood, a trunk, or a rear gate of the vehicle 10 may be set as an operation object. A lock which is subjected to locking/unlocking may or may not be a lock of a door which is to be opened and closed.

In the above description, two operations of locking/unlocking and opening/closing a door are performed using a single operation button on the mobile terminal 200, but two operations which are simultaneously performed may not be performed on the door as a control object. For example, unlocking of a door and starting of an air conditioner may be performed by a single operation button. Seat positioning, steering wheel positioning, or the like may be performed in addition to starting of the air conditioner.

Modified Example 8

In the above description, the mobile terminal 200 acquires terminal authentication information from the server 400, but the mobile terminal may be manufactured and sold in a state in which authentication information is stored in the authentication information storing unit 2032. Alternatively, the mobile terminal 200 may acquire terminal authentication information via a detachable storage medium. In this modified example, the mobile terminal 200 may not include the communication unit 202.

Modified Example 9

In the above-mentioned embodiment, the vehicle control device 300 and the key unit 100 perform radio communication, but the vehicle control device 300 and the key unit 100 may perform wired communication. That is, the key unit 100 may be directly connected to a vehicle network (for example, a controller area network (CAN)).

A system in which the key unit 100 and the vehicle control device 300 are incorporated may be mounted. In this case, two pieces of authentication information of terminal authentication information and a key ID may not be used and a vehicle system may perform control (such as unlocking) of a vehicle when authentication information transmitted from the mobile terminal 200 is proper.

Modified Example 10

In the above description, a control object is a vehicle, but an object which is operated by a mobile terminal is not limited to a vehicle. An operation object may be, for example, a facility or a building rather than a vehicle. Specifically, locking and unlocking or opening and closing of a door of a facility or a building may be performed using a mobile terminal 200. In this case, as well as locking, unlocking, opening, and closing of a door, starting or stopping of an air conditioner, a lighting device, a monitoring device, or the like may be controlled in addition to locking and unlocking of a door.

What is claimed is:

1. A key unit comprising:
a first communication module configured to perform radio communication with a user device using a first communication standard;
a second communication module configured to perform radio communication with a control device mounted in a vehicle or a facility using a second communication standard which is different from the first communication standard;
an authentication unit configured to perform authentication using authentication information when an operation request including the authentication information has been received from the user device via the first communication module; and
a control unit configured to perform locking and unlocking of the vehicle or the facility with a key in response to the operation request when the authentication using the authentication information has succeeded and to transmit a control signal for performing an operation other than the locking and unlocking with the key to the control device via the second communication module after the authentication.

2. The key unit according to claim 1, wherein the operation other than the locking and unlocking with the key includes an opening and closing operation of an opening-closing body associated with the key or an operation of starting or stopping an equipment in the vehicle or the facility.

3. The key unit according to claim 1, wherein the control unit is configured to transmit second authentication information stored in advance therein along with the control signal to the control device.

4. The key unit according to claim 1, wherein the first communication module, the second communication module, the authentication unit, and the control unit are mounted in the vehicle or the facility.

5. The key unit according to claim 1, wherein the control unit is configured to transmit only a control signal for controlling locking and unlocking with the key to the control device when the operation request is a first operation request and to transmit a control signal for performing the operation other than locking and unlocking with the key to the control device via the second communication module when the operation request is a second operation request.

6. A control system comprising:
a user device; and
the key unit according to claim 5,
wherein the user device is configured to transmit the first operation request including the authentication information to a control device mounted in the vehicle or the facility in response to a detection of a first type of input operation and to transmit the second operation request including the authentication information to the control device in response to a detection of a second type of input operation which is different from the first type.

7. The control system according to claim 6, wherein the user device includes a touch panel, and
wherein the user device is configured to transmit the first operation request including the authentication information to the control device when the first type of input operation is performed in a first area of the touch panel and is configured to transmit the second operation request including the authentication information to the control device when the second type of input operation is performed in a second area different from the first area of the touch panel.

8. The control system according to claim 7, wherein:
the first type of input operation is tap input on the touch panel; and
the second type of input operation is one of a long-tap input, a double-tap input, a slide input, and a gesture input on the touch panel.

9. The control system according to claim 6, further comprising a control device, wherein:
the control unit of the key unit is configured to transmit second authentication information stored in advance therein along with the control signal to the control device; and
the control device is configured to perform an operation which is indicated by the control signal when authentication using the second authentication information has succeeded.

10. The control system according to claim 6, wherein the key unit is mounted in the vehicle or the facility.

11. A control method for a key unit including a first communication module configured to perform radio communication with a user device using a first communication standard and a second communication module configured to perform radio communication with a control device mounted in a vehicle or a facility using a second communication standard which is different from the first communication standard, the control method comprising:
receiving an operation request including authentication information from the user device via the first communication module;
performing authentication using the authentication information; and
performing locking and unlocking of the vehicle or the facility with a key in response to the operation request when the authentication using the authentication information has succeeded and transmitting a control signal for performing an operation other than the locking and unlocking with the key to the control device via the second communication module after the authentication.

12. A non-transitory computer-readable storage medium having a program stored therein, wherein the program is a program causing a computer to perform the control method according to claim 11.

13. The non-transitory computer-readable storage medium according to claim 12, wherein the key unit is mounted in the vehicle or the facility.

14. The control method according to claim 11, wherein the key unit is mounted in the vehicle or the facility.

* * * * *

UNITED STATES PATENT AND TRADEMARK OFFICE
CERTIFICATE OF CORRECTION

PATENT NO. : 10,706,650 B2
APPLICATION NO. : 16/158705
DATED : July 7, 2020
INVENTOR(S) : Yasuyuki Tamane, Tsukasa Takahashi and Masaki Oshima It is certified that error appears in the above-identified patent and that said Letters Patent is hereby corrected as shown below:

On the Title Page

Item (72), inventor 1, city, delete "Miyoshi Aichi-ken" and insert --Miyoshi-shi Aichi-ken--, therefor.

In the Specification

In Column 2, Line(s) 2, after "device", delete ",".

In Column 3, Line(s) 41 & 42, after "having", delete ",".

In Column 14, Line(s) 60, after "Through", delete ",".

Signed and Sealed this
Tenth Day of November, 2020

Andrei Iancu
*Director of the United States Patent and Trademark Office*